Patented Apr. 7, 1942

2,279,277

UNITED STATES PATENT OFFICE 2,279,277

REMOVAL OF OXYGEN AND THE LIKE FROM ORGANIC SUBSTANCES

Bernard H. Shoemaker, Hammond, Ind., assignor to Standard Oil Company, Chicago, Ill., a corporation of Indiana No Drawing. Original application February 16, 1939, Serial No. 256,722. Divided and this application June 21, 1941, Serial No. 399,227

14 Claims. (Cl. 196—43)

This invention relates to the removal of sulfur, oxygen and/or peroxides from materials containing one or more of them and more particularly to the removal of sulfur, oxygen and/or peroxides from petroleum products, oxidized organic materials and the like.

The present invention, while particularly adapted for the removal of sulfur from petroleum products, such as naphthas, motor fuels, kerosene, cleaning naphthas, lubricating oils, transformer oils, white oils, insulating oils, waxes and other petroleum products, is also applicable to the removal of sulfur from sulfur contaminated equipment as well as the removal of sulfur from the surface of rubber materials.

In practicing my invention, I treat the material from which it is desired to remove free sulfur, oxygen, or peroxides with a hydrocarbon substituted ammonium sulfur compound which is capable of forming a hydrocarbon substituted ammonium thiosulfate when reacted with one of the constituents to be removed. Thus, for the removal of free sulfur, I employ a hydrocarbon substituted ammonium sulfite, and particularly a neutral hydrocarbon substituted ammonium sulfite. The hydrocarbon substituted ammonium sulfite may be prepared extraneously or it may be formed in situ by adding an amine in excess amounts to the material to be treated and then slowly introducing therein an excess of sulfur dioxide. The mechanism for the complete reactions involved in the formation of the hydrocarbon substituted ammonium sulfite and the removal of sulfur may be illustrated by the following equations, using in the example a tertiary amine:

(1) $2R_3N + SO_2 + H_2O \rightarrow (R_3NH)_2SO_3$
(2) $(R_3NH)_2SO_3 + S \rightarrow (R_3NH)_2S_2O_3$ in which R represents a hydrocarbon radical, particularly an aliphatic radical, either saturated or unsaturated, or a cycloaliphatic radical. By way of example, the following amines may be used:

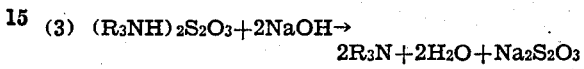

Monoethylamine
Diethylamine
Triethylamine
Monopropylamine
Dipropylamine
N-monobutylamine
N-dibutylamine
N-tributylamine
Diethylenetriamine
Triethylene tetramine
Piperidine
Monoamylamine
Diamylamine
Triisoamylamine
Cyclohexylamine
Dicyclohexylamine and others. In general, it may be stated that amines having ionization constants greater than $6.5 \times 10^{-5}$ are effective, whereas, amines having ionization constants less than this value are less effective.

In order to facilitate the recovery of the amine from the final reaction product, namely, the thiosulfate, it is preferable to employ amines which are water insoluble.

To recover the amines from the thiosulfates, the latter is treated with caustic, thereby liberating the amine and forming sodium thiosulfate. The mechanism for this reaction may be represented by the following equation:

(3) $(R_3NH)_2S_2O_3 + 2NaOH \rightarrow$

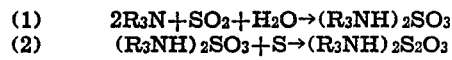
$2R_3N + 2H_2O + Na_2S_2O_3$ in which R represents, as aforementioned, an aliphatic or cycloaliphatic radical. Since the amine employed in the reaction is ultimately recovered and recycled, the only chemicals consumed in the process are sulfur dioxide and sodium hydroxide.

As an example of the present invention, to about 50 volumes of sulfur containing naphtha, there were added about 3 volumes of triamylamine and an equal volume of water and the mixture saturated with gaseous sulfur dioxide. After settling, the aqueous layer was separated from the naphtha and the latter then washed several times with water. The treated naphtha, when tested with sodium plumbite and mercaptans, formed no lead sulfide, indicating that the treated naphtha contained no free sulfur. An untreated sample of the same sulfur-saturated naphtha gave a heavy precipitate of lead sulfide when tested with sodium plumbite and mercaptans.

While I have described my invention as applied to the removal of sulfur from sulfur containing materials, this is not the only application of the invention. As aforementioned, the invention is equally suited for the removal of oxygen and/or peroxides from materials containing the same. Thus, an important application of the invention is the removal of peroxides from organic bodies containing the same, such as oxidized petroleum products, oxidized animal and vegetable fats and fatty oils, oxidized ethers, oxidized ketones, oxidized rubber and other organic materials. Further, the presence of traces of organic peroxides in motor fuels lowers the octane number of the fuel, and influences chemical reactions, such as the chlorination of hydrocarbons. It is, therefore, highly desirable to have an effective method of removing such organic peroxides.

The invention may be applied also to the removal of oxygen from closed systems in which the presence of oxygen is detrimental to the operation of such systems, such as the removal of oxygen from sealed refrigeration systems in which the presence of oxygen causes deterioration and oxidation of the lubricant. The invention may also be used to remove oxygen in systems such as closed electrical transformers where the presence of oxygen results in the oxidation of the insulating oil. The invention is applicable to the removal of oxygen from reactions such as the thermal treatment and polymerization of organic compounds.

As in the case of the removal of sulfur from materials containing the same, the oxygen and/or peroxides are removed by treating the material containing them with a hydrocarbon substituted ammonium sulfur compound which is capable of forming a hydrocarbon substituted ammonium thiosulfate when reacted with oxygen and/or peroxides. Whereas in the removal of free sulfur a hydrocarbon substituted ammonium sulfite is employed, for the removal of oxygen and/or peroxides, I employ a hydrocarbon substituted ammonium sulfide, since the reaction of the hydrocarbon substituted ammonium sulfide with oxygen and/or peroxides forms the desired substituted ammonium thiosulfate. The hydrocarbon ammonium substituted sulfide may be used as such or it may be formed in situ by adding an amine to the material to be treated and subsequently introducing thereinto hydrogen sulfide. The mechanism for the complete reactions involved in the removal of oxygen and/or peroxides from material containing the same, may be represented by the following equations, using in the example a tertiary amine:

(4) $R_3N + H_2S \rightarrow R_3NHSH$
$2R_3NHSH + 2O_2 \rightarrow (R_3NH)_2S_2O_3 + H_2O$ (5) $R_3N + H_2S \rightarrow R_3NHSH$
$2R_3NHSH + 2R'O_2 \rightarrow (R_3NH)_2S_2O_3 + 2R' + H_2O$ in which R represents an aliphatic or cycloaliphatic amine as heretofore defined and $R'O_2$ represents an organic peroxide. As hereinbefore stated, the hydrocarbon ammonium substituted thiosulfate may be decomposed with caustic for the recovery of the amine.

As an example, the invention in removing peroxides from organic bodies, 50 volumes of a U. S. P. white oil, which had been in storage for several years and which contained a large amount of peroxide, were treated with about 3 volumes of triamylamine and an equal amount of water. This mixture was then blown with nitrogen to remove the oxygen present and thereafter hydrogen sulfide was slowly added. After settling the aqueous layer was separated and the oil layer washed several times with water, after which the oil was tested with a peroxide test solution which is a mixture of ferrous sulfate and ammonium thiocyanate ($FeSO_4$ and $NH_4SCN$). When so tested, the oil gave a negative test for peroxides while the untreated oil gave a deep red color indicating the presence of peroxides.

This application is a division of my application Serial No. 256,722, filed February 16, 1939.

While I have described my invention in connection with several specific examples thereof, it is to be understood that the invention is not limited thereby but that numerous modifications within the scope of the appended claims will occur to those skilled in the art in the light of my disclosure of my invention.

I claim:

1. The method of removing an oxygen-containing impurity such as oxygen and peroxides from a material containing the same comprising treating said material with an ammonium sulfur compound in which at least one of the hydrogen atoms has been substituted by a hydrocarbon radical, said ammonium sulfur compound being capable of forming an ammonium thiosulfate in which at least one of the hydrogenations has been substituted by a hydrocarbon radical when reacted with said oxygen-containing substance and subsequently separating and removing said ammonium thiosulfate so formed.

2. The method of removing an oxygen-containing substance such as oxygen and peroxides from a material containing the same comprising treating said material with an ammonium sulfide in which at least one of the hydrogen atoms has been substituted by a hydrocarbon radical, said ammonium sulfide being capable of forming an ammonium thiosulfate in which at least one of the hydrogen atoms has been substituted by a hydrocarbon radical when reacted with said oxygen-containing substance and subsequently separating and removing said ammonium thiosulfate so formed.

3. The method as described in claim 2 in which at least one of the hydrogen atoms of the ammonium sulfide has been substituted by an aliphatic hydrocarbon radical.

4. The method as described in claim 2 in which at least one of the hydrogen atoms of the ammonium sulfide has been substituted by a butyl radical.

5. The method as described in claim 2 in which at least two of the hydrogen atoms of the ammonium sulfide are substituted by amyl radicals.

6. The method as described in claim 2 in which at least one of the hydrogen atoms of the ammonium sulfide has been substituted by an amyl radical.

7. The method of removing peroxides from an organic substance containing the same comprising treating said organic substance with an ammonium sulfide in which at least one of the hydrogen atoms has been substituted by an aliphatic hydrocarbon radical, which aliphatic hydrocarbon substituted ammonium sulfide reacts with the peroxides to form an ammonium thiosulfate in which at least one of the hydrogen atoms is substituted by an aliphatic hydrocarbon radical and subsequently separating and removing said ammonium thiosulfate so formed.

8. The method of removing organic peroxides from organic substances containing the same, comprising adding an aliphatic amine to said substance, introducing hydrogen sulfide into said mixture, whereby there is formed an ammonium sulfide in which at least one of the hydrogen atoms of the ammonium sulfide has been substituted by an aliphatic hydrocarbon radical, and subsequently removing the ammonium thiosulfate in which at least one of the hydrogen atoms has been substituted by an aliphatic hydrocarbon radical resulting from the reaction of the organic peroxide with said sulfide, from the organic substance being treated.

9. The method described in claim 8 in which the aliphatic amine is diamylamine.

10. The method described in claim 8 in which the aliphatic amine is triamylamine.

11. The method as described in claim 8 in which the aliphatic amine is tributylamine.

12. The method described in claim 8 in which the ammonium thiosulfate is subsequently decomposed with caustic and the amine recovered.

13. The method of removing organic peroxides from petroleum products containing the same, comprising adding an oil-soluble aliphatic amine to the petroleum product, introducing hydrogen sulfide into a mixture of the petroleum product and the oil-soluble aliphatic amine, whereby there is formed an ammonium sulfide in which at least one of the hydrogen atoms of the ammonium sulfide has been substituted by an aliphatic hydrocarbon radical and subsequently removing from the petroleum product the ammonium thiosulfate in which at least one of the hydrogen atoms has been substituted by an aliphatic hydrocarbon radical resulting from the reaction of the organic peroxide with said sulfide.

14. The method as described in claim 13 in which the aliphatic amine has an ionization constant greater than about $6.5 \times 10^{-5}$.

BERNARD H. SHOEMAKER.